(12) United States Patent
Havener

(10) Patent No.: US 8,454,032 B2
(45) Date of Patent: Jun. 4, 2013

(54) SELF-PROPELLED LAWN MOWER AND SULKY DEVICE

(75) Inventor: Chris Havener, Bradley, IL (US)

(73) Assignee: Havener Enterprises, Inc., Bradley, IL (US)

(*) Notice: Subject to any disclaimer, the term of this patent is extended or adjusted under 35 U.S.C. 154(b) by 178 days.

(21) Appl. No.: 12/932,154

(22) Filed: Feb. 18, 2011

(65) Prior Publication Data
US 2012/0211954 A1 Aug. 23, 2012

(51) Int. Cl.
*B62D 63/00* (2006.01)
(52) U.S. Cl.
USPC ........... 280/32.7; 280/492; 280/493; 280/494
(58) Field of Classification Search
USPC .................. 280/32.7, 492, 493, 494; 56/11.9, 56/16.2, 14.7
See application file for complete search history.

(56) References Cited

U.S. PATENT DOCUMENTS

| | | | | |
|---|---|---|---|---|
| 4,876,846 A | * | 10/1989 | Torras | 56/11.9 |
| 5,575,140 A | * | 11/1996 | Bermes et al. | 280/32.7 |
| 5,697,623 A | * | 12/1997 | Bermes et al. | 280/32.7 |
| 5,810,371 A | * | 9/1998 | Velke | 280/32.7 |
| 5,813,679 A | * | 9/1998 | Hobrath | 280/32.7 |
| 5,909,887 A | * | 6/1999 | Hobrath | 280/32.7 |
| 5,947,505 A | * | 9/1999 | Martin | 280/493 |
| 6,145,855 A | * | 11/2000 | Bellis, Jr. | 280/32.7 |
| 6,637,760 B1 | * | 10/2003 | Carman | 280/32.7 |
| 7,624,996 B2 | * | 12/2009 | Velke et al. | 280/32.7 |

* cited by examiner

*Primary Examiner* — Hau Phan
(74) *Attorney, Agent, or Firm* — Knechtel, Demeur & Samlan

(57) ABSTRACT

A self-propelled lawn mower and sulky device. The self-propelled lawn mower comprises handle bars and an operator console that are positioned between the front end and rear end of the lawn mower. A securing bar and a placement bar are designed and situated an a angle to one another to appropriately position the handle bars and operator console. The sulky device comprises an operator platform, a pair of sulky arms, a pair of caster wheels, and a hitch bar. When the sulky device is mounted to the self-propelled lawn mower, a first hinge means is used for attaching the operator platform to the hitch bar, a second hinge means is used for attaching the hitch bar to the lawn mower, and a third hinge means is used for attaching the caster wheels to the sulky arms.

16 Claims, 7 Drawing Sheets

SELF-PROPELLED LAWN MOWER AND SULKY DEVICE

I. CROSS-REFERENCE TO RELATED APPLICATION

Not applicable.

II. FIELD OF THE INVENTION

The present invention relates to self-propelled lawn mowers and sulky devices and, more particularly, to a self-propelled lawn mower and a sulky device that are uniquely designed and mounted to one another to improve the mobility, stability, and trimming capabilities of the lawn mower when in use.

III. DESCRIPTION OF THE PRIOR ART

Sulky devices have been used in conjunction with power mowers for many years and are, thus, well known in the prior art. Sulkies were originally used with mowers in a general trailer type fashion without the use of pivots. For example, U.S. Pat. No. 2,218,064 to G. A. Amsbury entitled "Riding Trailer" discloses a riding trailer which can be hitched to the rear of a lawn mower by two side bars. The riding trailer has a seat situated above a supporting wheel and the user is provided with foot controls to guide the movements of the lawn mower.

Later, sulkies were designed to incorporate the use of a vertical pivot point at the attachment of the sulky to the mower. For example, U.S. Pat. No. 5,118,123 to Betrock entitled "Standing/Sitting Lawn Mower Trailer" discloses a system in which a trailer hitches to a self-propelled lawn mower. The trailer has an elongated towbar which is adjusted and locked to the lawn mower. Similarly, U.S. Pat. No. 5,388,850 to Simone entitled "Convertible Sulky" discloses an H-shaped support wheelbase frame member with a T-shaped mower attachment frame.

To accommodate increased maneuverability, sulkies have been designed with vertical pivot points along the attachment arms to enable the lawn mower to maneuver through a narrow or small turning radius or as desired by the user. For example, U.S. Pat. No. 5,004,251 to Velke et al. entitled "Sulky Apparatus Attachable To A Self-Propelled Power Mower" discloses a sulky apparatus that is attachable to a self-propelled power mower to transport an operator in the standing position. The sulky provides a first arm connected to the lawn mower through a horizontal pivot point and a second arm connected to the operator platform. The first arm and the second arm are connected through a vertical pivot point permits movement of the operator platform about the vertical pivot point. In this fashion, the lawn mower can better navigate tight turns.

Likewise, U.S. Pat. Nos. 5,810,371 and 5,882,020 to Velke entitled "Sulky Device With Triple Pivot Attachment To Mower" disclose the sulky in U.S. Pat. No. 5,004,251 with a third pivot point located at the connection of the second arm to the operator platform and an additional wheel to form a two-wheeled sulky. The third pivot point operates along the horizontal axis and theoretically provides a storage position for the operator platform with respect to the lawn mower.

Although these sulkies permit operation in small areas, they do not leverage the forces and loads on the vertical pivot point as applied by the weight of the operator and torque of the mower. Therefore, the vertical pivot point was susceptible to uncontrollable bending or structural failure of the vertical pivot point. Also, the uncontrollable bending or structural failure requires that the weight of the operator must be limited to reduce the counterbalancing forces on the vertical pivot point. Another shortcoming of these sulkies is that the vertical pivot point permits 360° rotation about the first arm. The inherent danger with the free rotation is that a user is vulnerable to injury if positioned on the operator platform as the second arm rotates the operator platform to cross under the first arm. Therefore, these sulkies are not practical for all consumers.

These problems were overcome by U.S. Pat. No. 6,375,201 to Havener, entitled "Walk Behind Mower Sulky Apparatus With Improved Operator Platform Attachment Means" which discloses an operator platform attached to a hitch arm through the interconnection of a vertical pivot tube and an essentially C-shaped clevis. The clevis counter balances and leverages the forces and loads that are applied to the vertical pivot pin while the sulky is in operation and, thereby, prevents the unnecessary anomalies and structural failures of the vertical pivot pin. The design further limited the angle of rotation to prevent operator injury from the platform sweeping under the hitch arm.

Now, Applicant has improved upon all of these earlier devices with its self-propelled lawn mower and a sulky device that are uniquely designed and mounted to one another to further improve the mobility, stability, and trimming capabilities of the lawn mower when in use. Thus, there is a need and there has never been disclosed Applicant's self-propelled lawn mower and a sulky device.

IV. SUMMARY OF THE INVENTION

The present invention is a self-propelled lawn mower and sulky device. The self-propelled lawn mower comprises handle bars and an operator console that are positioned between the front end and rear end of the lawn mower. A securing bar and a placement bar are designed and situated an a angle to one another to appropriately position the handle bars and operator console. The sulky device comprises an operator platform, a pair of sulky arms, a pair of caster wheels, and a hitch bar. When the sulky device is mounted to the self-propelled lawn mower, a first hinge means is used for attaching the operator platform to the hitch bar, a second hinge means is used for attaching the hitch bar to the lawn mower, and a third hinge means is used for attaching the caster wheels to the sulky arms.

V. BRIEF DESCRIPTION OF THE DRAWINGS

The Description of the Preferred Embodiment will be better understood with reference to the following figures.

VI. DETAILED DESCRIPTION OF THE PREFERRED EMBODIMENT

Figure 1:
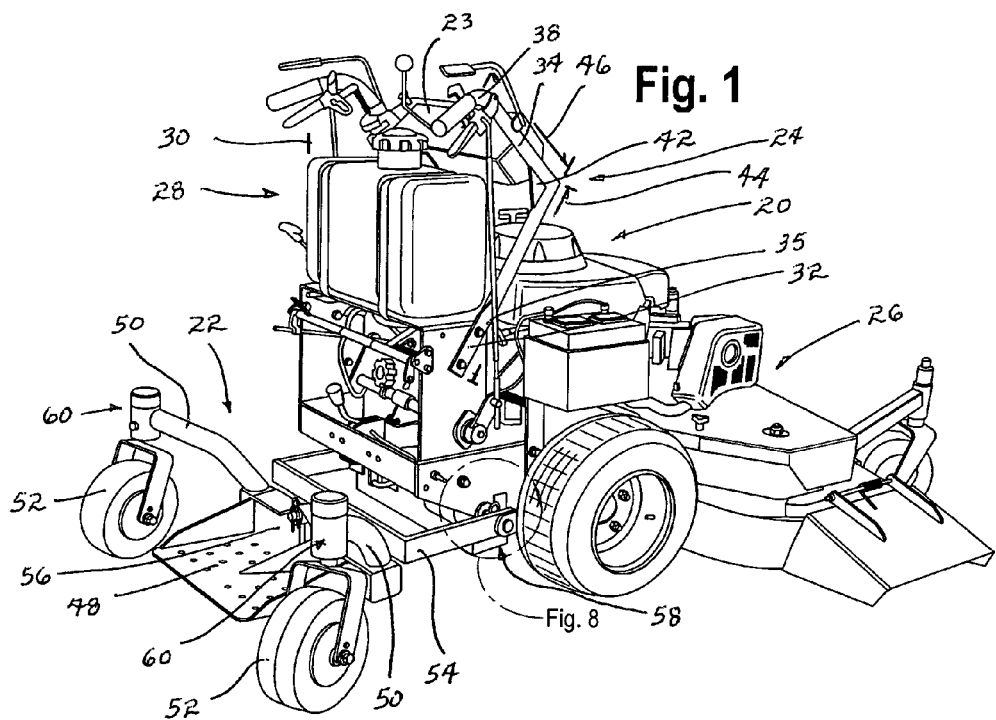
FIG. 1 is a perspective view of the inventive self-propelled lawn mower and sulky device.

Turning first to FIG. 1, there is illustrated a self-propelled lawn mower 20 and a sulky device ("sulky") 22. For purposes of this patent application, the self-propelled lawn mower 20 may be any type of and, operate in the same manner as any, self-propelled lawn mower that is known to one skilled in the art. To accomplish Applicant's invention, and as further described in more detail below, the self-propelled lawn mower 20 is provided with an operator console 23 and handle bars 24 in which the position of these components have been altered.

The self-propelled lawn mower 20 has a front end 26 and a rear end 28. In the preferred embodiment, the rear end 28 of the lawn mower 20 defines a vertical plane 30.

The handle bars 24 are separated into and/or comprise a securing bar 32 and a placement bar 34. The securing bar 32 is provided with securing holes 35 for use with threaded bolts 36 to fixedly secure the securing bar 32 to the lawn mower 20. Alternatively, any other means known to one skilled in the art for securing the securing bar 32 to the lawn mower 20 may be used. Upon securing the securing bar 32 to the lawn mower 20, the securing bar 32 extends, a securing bar length 44, forwardly toward the front end 26 of the lawn mower 20 and upwardly for attachment to or connection with the placement bar 34. Preferably, the securing bar 32 is integrally molded to the placement bar 34. Alternatively, any other means for attaching the securing bar 32 to the placement bar 34 known to one skilled in the art may be used. The placement bar 34 then extends, a placement bar length 46, rearwardly toward the rear end 28 of the lawn mower 20 and upwardly to adjacent the operator console 23 and terminating in a gear handle 38. In this manner, the securing bar 32 and the placement bar 34 are positioned at an angle 42 to one another.

Figure 3:
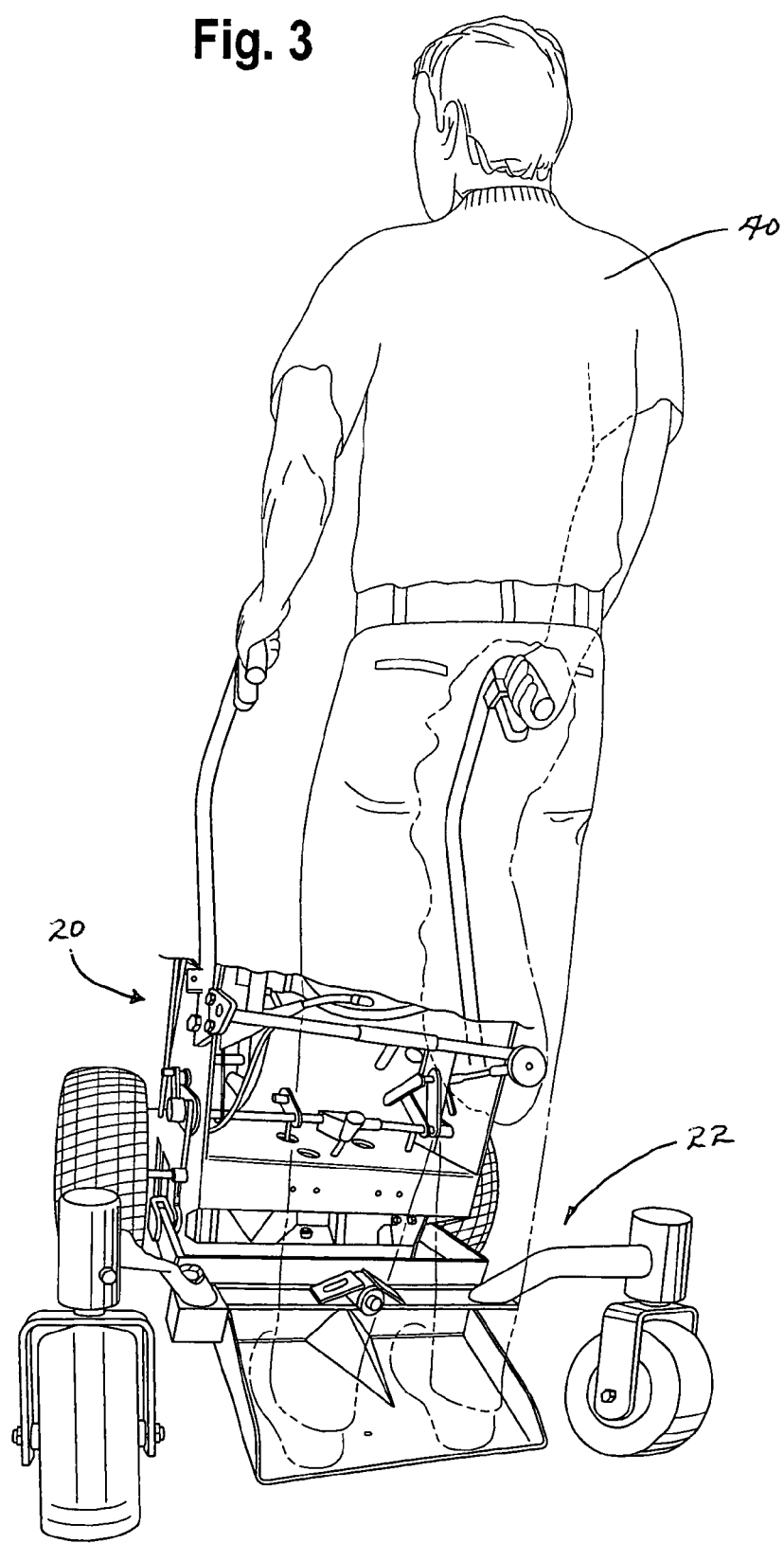
FIG. 3 is a perspective view of the sulky device and self-propelled lawn mower, with portions removed, and depicting an operator in position during operation of the device.
Figure 4:
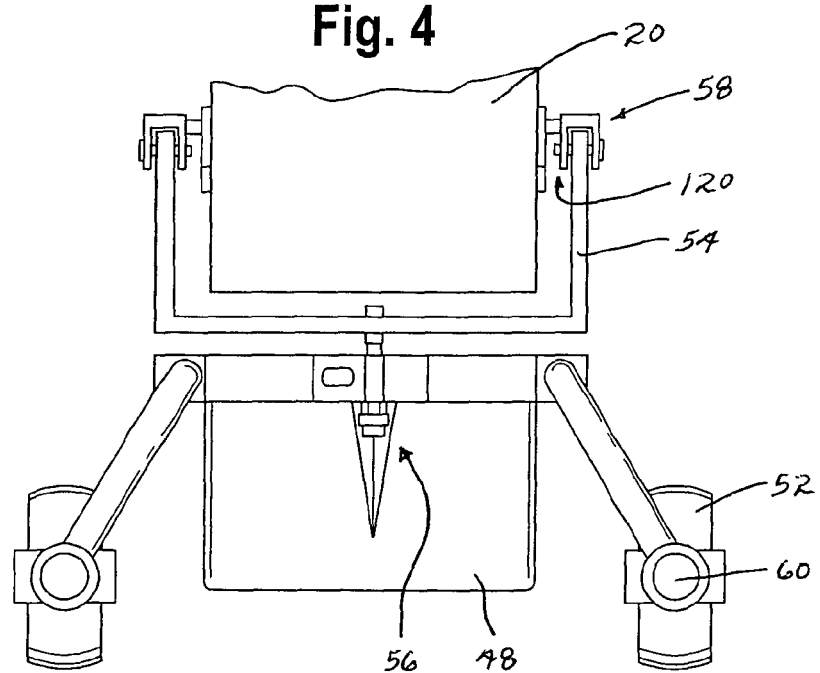
FIG. 4 is a top view of the sulky device and further illustrating the attachment of the sulky device to the self-propelled lawn mower.

In the preferred embodiment, the handle bars 24 (i.e., securing bar 32, placement bar 34, and gear handles 38) and operator console 23 are situated and/or positioned: (a) between the front end 26 and rear end 28 of the lawn mower 20 and forward of the vertical plane 30; and (b) at the appropriate height for ease of use of the operator console 23 and the gear handles 38 by an operator 40 (see FIG. 3) when in use with the sulky 22. As such, to accomplish this, Applicant has designed the securing bar length 44 to be preferably longer than the placement bar length 46 and the angle 42 between the securing bar 32 and the placement bar 34 to be formed an obtuse angle. Alternatively, either or both of the securing bar length 44 of the securing bar 32 and the placement bar length 46 of the placement bar 34 may be altered to be longer or shorter and/or the angle 42 may be altered to be an acute angle, or any all possible combinations thereof; provided that, the above conditions are provided for.

The sulky 22 comprises an operator platform 48, a pair of sulky arms 50, a pair of caster wheels 52, and a hitch bar 54. In the preferred embodiment, a first hinge means 56 is used for attaching the operator platform 48 to the hitch bar 54; a second hinge means 58 is used for attaching the hitch bar 54 to the lawn mower 20; and a third hinge means 60 is used for attaching the caster wheels 52 to the sulky arms 50.

Figure 2:
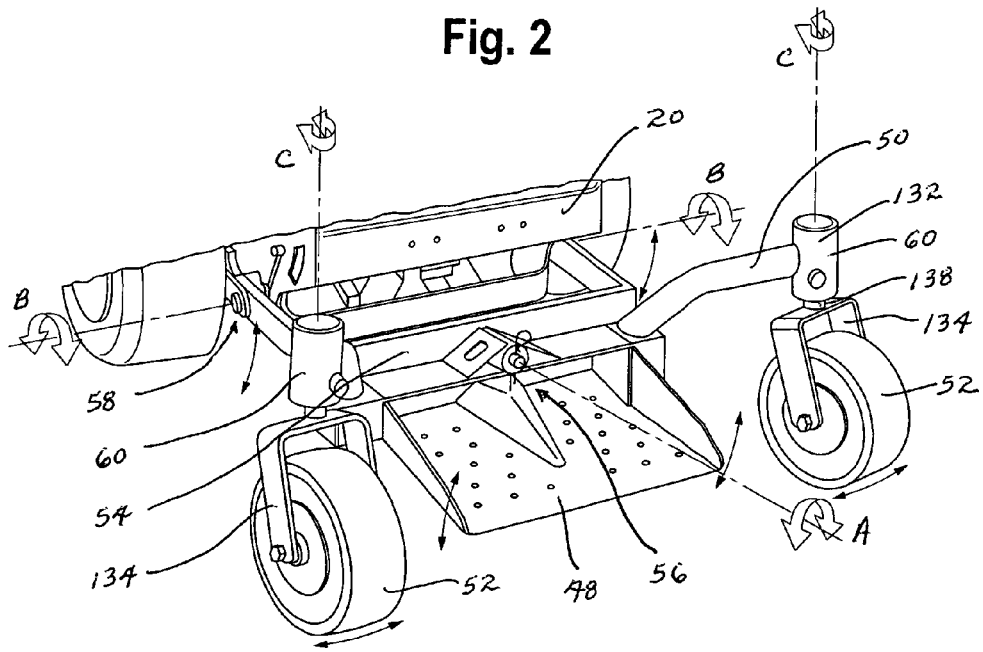
FIG. 2 is a perspective view of the sulky device mounted to the self-propelled lawn mower and, in particular, illustrating the second hinge means and third hinge means.
Figure 6:
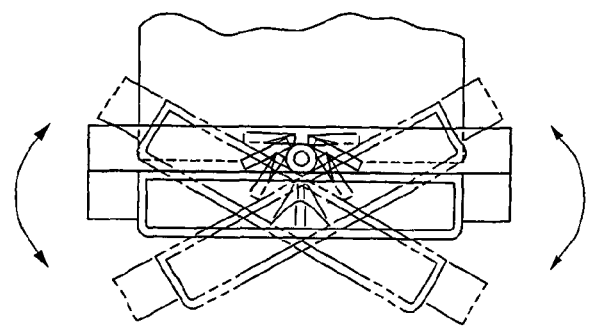
FIG. 6 is a partial rear view of the sulky device and, in particular, illustrating the connection between the operator platform and the hitch bar and a first axis of rotation of the operator platform in relation to the hitch bar.

In the preferred embodiment, as illustrated in FIG. 2, the first hinge means 56 permits the operator platform 48 to rotate or pivot about a first axis of rotation A in relation to the hitch bar 54 (see also FIG. 6). In this manner, when in use and the self-propelled lawn mower 20 is pulling the sulky 22, if the self-propelled lawn mower 20 encounters uneven terrain which will cause the self-propelled lawn mower 20 to traverse in a horizontal direction (either left or right) which is different than the terrain which is currently being traversed by the sulky 22, the first hinge means 56 permits the operator platform 48 to rotate or pivot about the first axis of rotation A (or a first horizontal axis) in relation to the hitch bar 54, and likewise the self-propelled lawn mower 20, to thereby permit the independent movement of both the self-propelled lawn mower 20 and sulky 22 to accommodate this uneven terrain.

Figure 5:
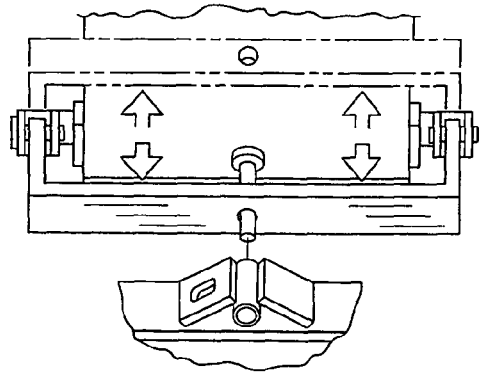
FIG. 5 is a partial perspective view of the sulky device and, in particular, illustrating the connection between the operator platform and the hitch bar and a second axis of rotation of the hitch bar in relation to the self-propelled lawn mower.

The second hinge means 58 permits the hitch bar 54 and, likewise the operator platform 48, to rotate or pivot about a second axis of rotation B in relation to the self-propelled lawn mower 20 (see also FIG. 5). In this manner, when in use and the self-propelled lawn mower 20 is pulling the sulky 22, if the self-propelled lawn mower 20 encounters uneven terrain which will cause the self-propelled lawn mower 20 to traverse in a vertical direction (either upwardly or downwardly) which is different than the terrain which is currently being traversed by the sulky 22, the second hinge means 58 permits the hitch bar 54 and, likewise the operator platform 48, to rotate or pivot about the second axis of rotation B (or a second horizontal axis which is perpendicular to the first horizontal axis) in relation to the self-propelled lawn mower 20, to thereby permit the independent movement of both the self-propelled lawn mower 20 and sulky 22 to accommodate this uneven terrain.

The third hinge means 60 permits the caster wheels 52 to rotate or pivot about a third axis of rotation C in relation to the sulky arms 50. In this manner, when in use and the self-propelled lawn mower 20 is pulling the sulky 22, if the self-propelled lawn mower 20 and sulky 22 are encountering uneven terrain and each is traversing in the horizontal direction (either left or right) or in the vertical direction (either upwardly or downwardly), the third hinge means 60 permits the caster wheels 52 to rotate or pivot about the third axis of rotation C (or a vertical axis) in relation to the sulky arms 50, to thereby permit the independent movement of the caster wheels 52 to accommodate this uneven terrain and facilitate the continued movement of the sulky 22 behind the self-propelled lawn mower 20.

Figure 7:
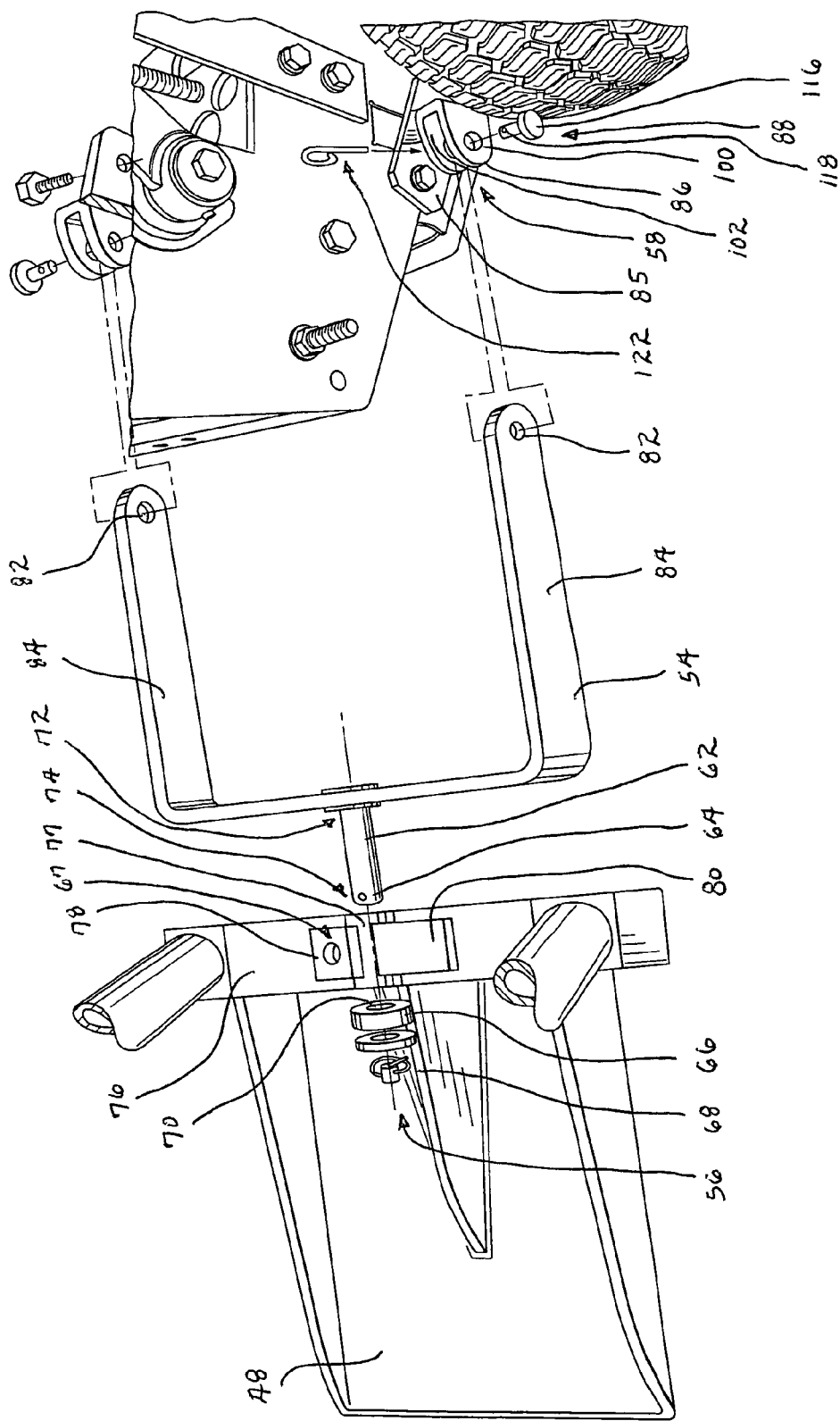
FIG. 7 is an exploded view of the sulky device and attachment to the self-propelled lawn mower.

The first hinge means 56 is more clearly illustrated in FIG. 7. In the preferred embodiment, the first hinge means 56 comprises a shaft 62 having a shaft hole 64, a tube 66, a retaining means 67, and a first pin securing means 68.

The shaft 62 is preferably rigid having opposed ends 72 and 74. Opposed end 72 is fixedly secured to the hitch bar 54. The shaft 62 extends outwardly from the hitch bar 54 to opposed end 74 where the shaft hole 64 is located.

The tube 66 is positioned adjacent to a flange 76 on the operator platform 48. The tube 66 contains a bearing (not illustrated) that extends through the tube 66 and a bore 70 that extends through the center of the bearing. In the preferred embodiment, the bore 70 is situated in alignment with the shaft 62. The tube 66 is illustrated as being cylindrical in shape, however, the tube 66 may alternatively be any other shape desired provided that the tube 66 accomplishes the invention as disclosed.

Figure 9:
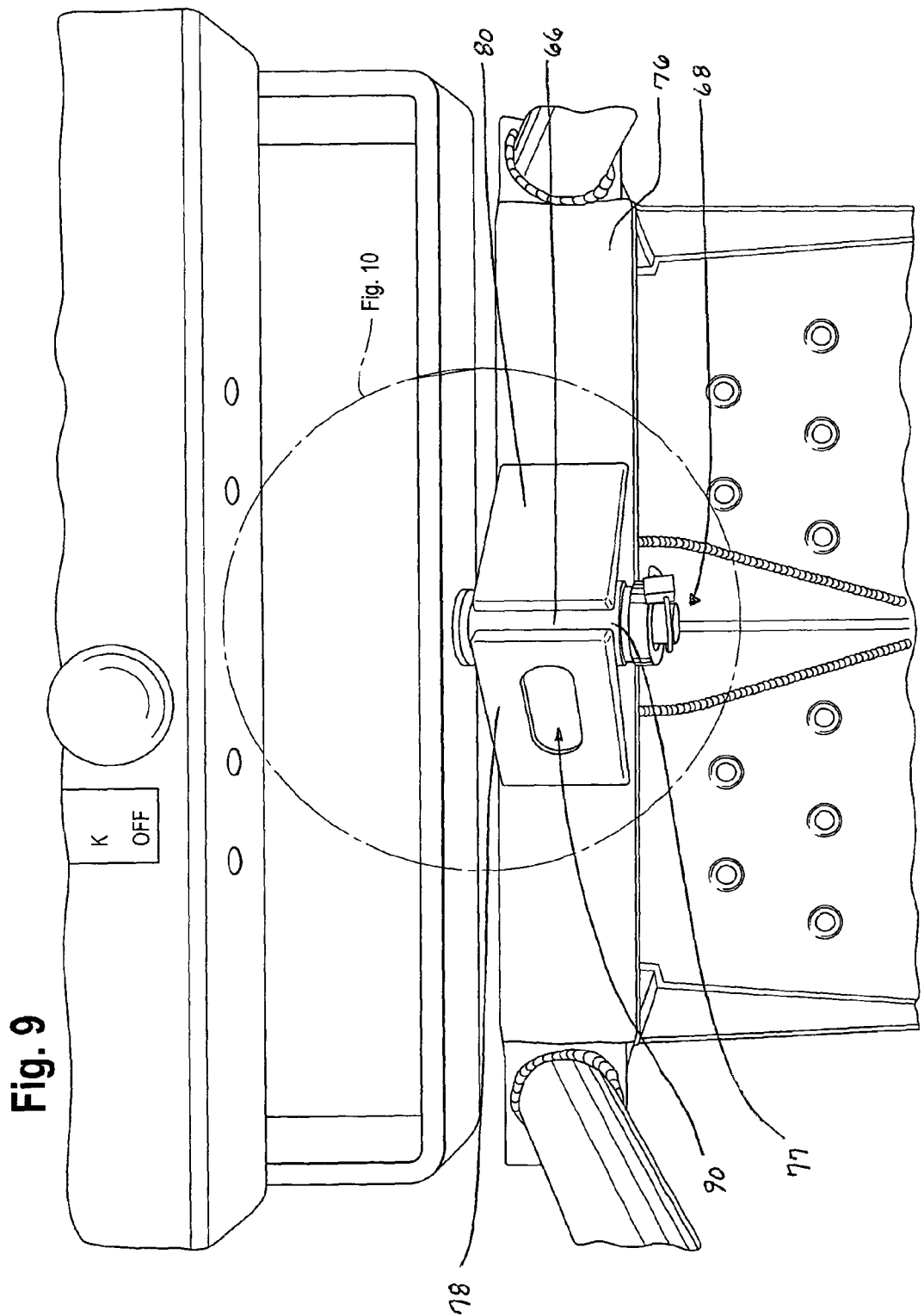
FIG. 9 is a top perspective view of the sulky device, with portions removed, illustrating the connection of the operator platform to the hitch bar and, in particular, the first hinge means.

To create the first hinge means 56, the opposed end 74 of the shaft 62 is inserted into and through the bore 70 of the tube 66 until the shaft hole 64 of the shaft 62 exits the bore 70 of the tube 66. The retaining means 67 fixedly secures the tube 66 to the flange 76 of the operator platform 48 (see also FIG. 9 and FIG. 10).

In the preferred embodiment, the retaining means 67 comprises a cover 77 and two opposed retaining walls 78 and 80. As further illustrated in FIG. 9 and FIG. 10, the tube 66 is situated or enclosed between the cover 77 and the flange 76. Each retaining wall 78 and 80 is fixedly secured, at one end, to the flange 76 of the operator platform 48 and, at the other end, to the cover 77. In the preferred embodiment, the retaining wall 78 and 80 are fixedly secured to the flange 76 of the operator platform 48 and the cover 77 using solder or any other type of weld. Alternatively, the retaining wall 78 and 80 may be fixedly secured to the flange 76 and/or cover 77 using any other means known to one skilled in the art. Retaining wall 78 is also provided with a hole 90.

Figure 10:
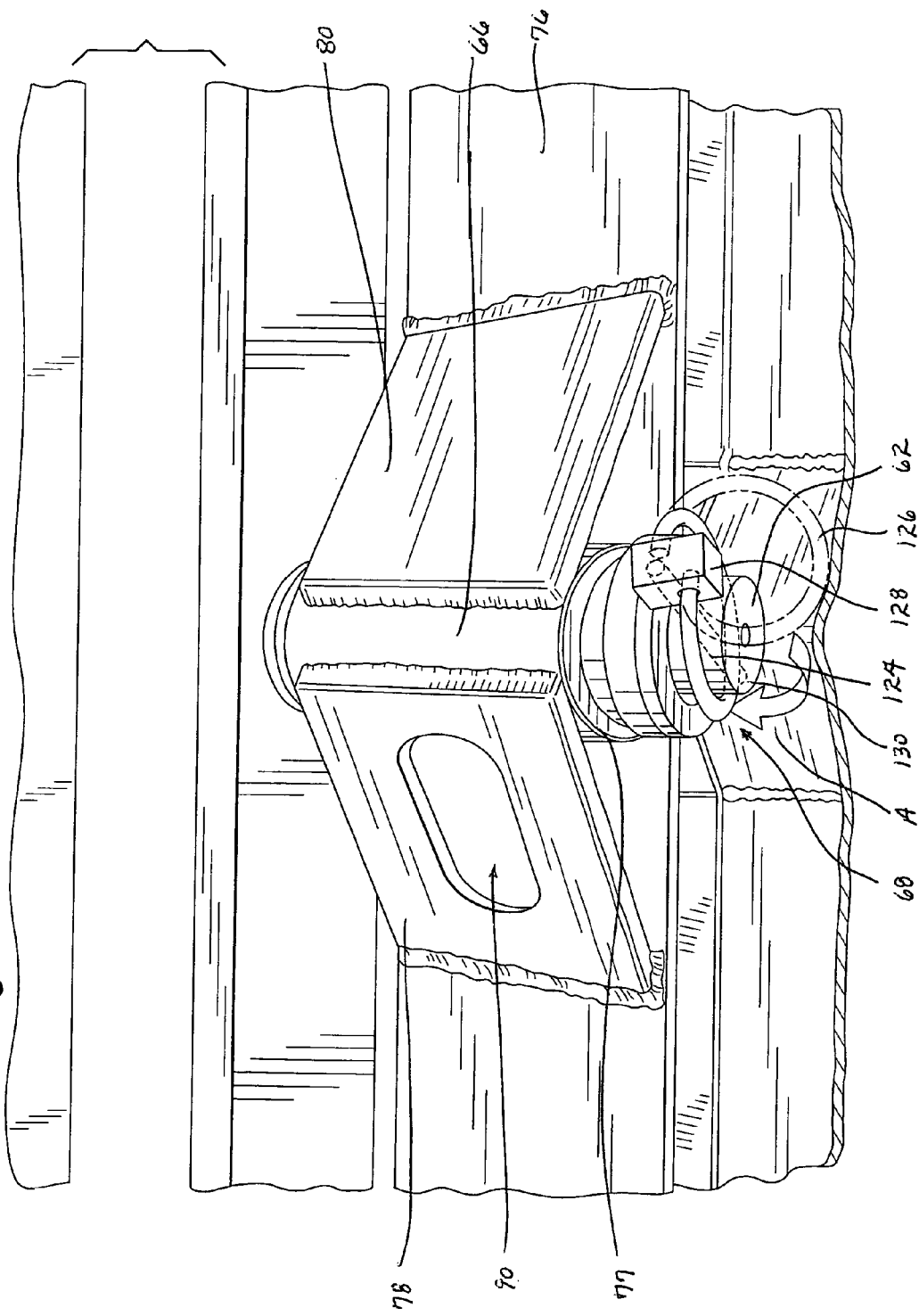
FIG. 10 is a top perspective view of the first hinge means for connecting the operator platform to the hitch bar.

In the preferred embodiment, and as illustrated in FIG. 10, the first pin securing means 68 then releaseably secures the shaft 62 to the tube 66. The first pin securing means 68 is a linchpin which comprises a pin 124, a wheel 126, and a fastening member 128. The pin 124 is attached at one end to the fastening member 128 and has a free end 130. The wheel 126 is rotatably attached, at both ends, to the fastening member 128. In use, the free end 130 of the pin 124 is inserted into and through the shaft hole 64 until the fastening member 128 engages the shaft 62, and then, the wheel 126 is rotated through rotation A to lock on to the shaft 62. In this manner, the first pin securing means 68 secures the shaft 62 to the tube 66. Alternatively, the first pin securing means 68 may be accomplished using any other means known to one skilled in the art.

Figure 8:
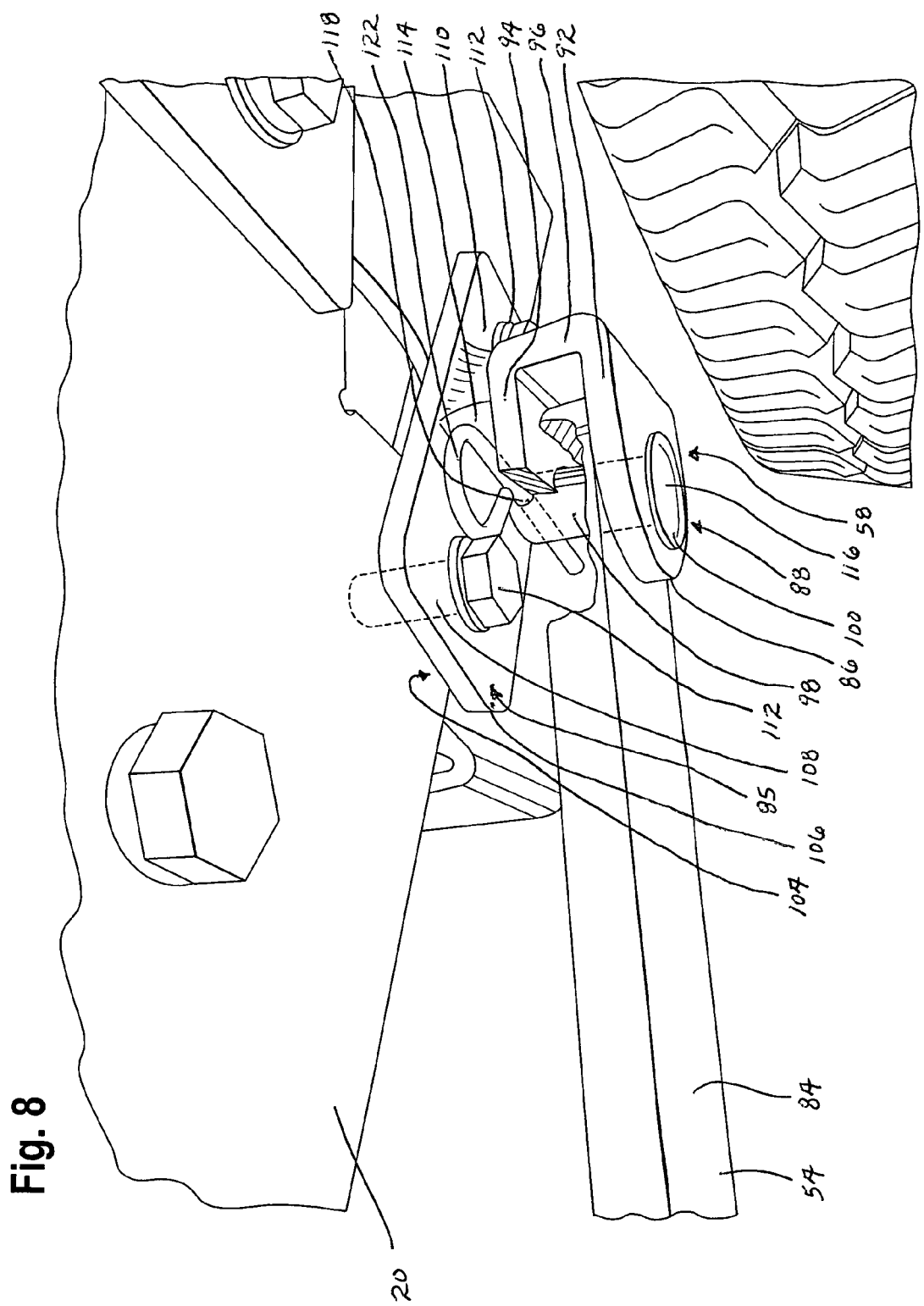
FIG. 8 is a perspective view illustrating the connection of the hitch bar to the self-propelled lawn mower and, in particular, the second hinge means.

The second hinge means 58 is more clearly illustrated in FIG. 7 and FIG. 8. As illustrated, the hinge bar 54 comprises a pair of opposed hinge arms 84, each hinge arm 84 having a hinge hole 82. In the preferred embodiment, the second hinge means 58 comprises the hinge arms 84 having the hinge holes 82, a mounting bracket 86, an interconnecting bracket 85, and a second pin securing means 88.

The mounting bracket 86 provides two opposed sidewalls 92 and 94, a back wall 96, and further defining an opening 98 between them. Each sidewall 92 and 94 provides a sidewall hole 100 and 102 and which are positioned in the sidewall 92 and 94 to be in direct alignment across from one another.

The interconnecting bracket 85 is substantially flat in shape and having two opposed surfaces 104 and 106 and bracket holes 108 and 110. In the preferred embodiment, threaded bolts 112 are inserted through each bracket hole 108 and 110 of the interconnecting bracket 85 and into a corresponding hole (not illustrated) in the lawn mower 20. Bolts or other means (not illustrated) are used to tighten the interconnecting bracket 85 to, and the surface 104 against, the lawn mower 20. Alternatively, the interconnecting bracket 85 may be fixedly secured to the lawn mower 20 using solder, weld, integrally molded to, or any other means known to one skilled in the art. A wedge 114 is preferably integrally molded to the surface 106 of the interconnecting bracket 85 and to the sidewall 94 of the mounting bracket 86. The wedge 114 creates a spacing 120 between the interconnecting bracket 85 and the mounting bracket 86. Alternatively, any other means known to one skilled in the art may be used to fixedly secure the interconnecting bracket 85 to the mounting bracket 86. In this manner, the interconnecting bracket 85 fixedly secures or interconnects the lawn mower 20 to the mounting bracket 86.

To attach the hinge bar 54 to the mounting bracket 86, the hinge arm 84 is inserted into the opening 98 of the mounting bracket 86 between the opposed sidewalls 92 and 94 until the hinge hole 82 in the hinge arm 84 is aligned between the sidewall holes 100 and 102. The second pin securing means 88 then secures the hinge bar 54 to the mounting bracket 86. In the preferred embodiment, the second pin securing means 88 comprises a pivot pin 116 having a pinhole 118 and a pin 122. The pivot pin 116 is inserted through the sidewall hole 100 of sidewall 92, through the hinge hole 82 of the hinge arm 84, and through the sidewall hole 102 of sidewall 94, until the pinhole 118 is exposed in the spacing 120 between the mounting bracket 86 and the interconnecting bracket 85. When this occurs, the pin 122 is inserted into and through the pinhole 118 to releaseably secure the pivot pin 116 to the mounting bracket 86 and hinge arm 84. The pin 122 is preferably a cotter pin, however, any pin known to one skilled in the art for securing a pivot pin 116 as described herein may be used.

The third hinge means 60 is more clearly illustrated in FIG. 2. In the preferred embodiment, the third hinge means 60 comprises a tube 132 and a yoke 134 having a yoke shaft 138.

The tube 132 contains a bearing (not illustrated) that is provided with a receiving chamber 136 (not illustrated). In the preferred embodiment, the receiving chamber 136 is situated in alignment with the yoke shaft 138. The tube 132 is illustrated as being cylindrical in shape, however, the tube 132 may alternatively be any other shape desired provided that the tube 132 accomplishes the invention as disclosed. To create the third hinge means 60, the yoke shaft 138 is inserted into the receiving chamber 136 of the bearing and retained by the tube 132. In the preferred embodiment, as the yoke 134 supports the caster wheels 52 and the yoke shaft 138 is freely rotatable within the tube 132 by the bearings, the caster wheels 52 can rotate three hundred and sixty degrees (360°), if desired, when the sulky 22 is in use with the self-propelled lawn mower 20.

As described in detail above and based on these disclosures, Applicant's unique inventive law mower and sulky device design provides several advantages including but not limited to: providing a mower that is shorter and more maneuverable; providing a mower that is more stable and, particularly, when traversing or moving across steep terrain or slopes; providing a mower that can accomplish shorter turns; providing a mower that enables greater vision for the operator over the front of the mowing deck; providing a mower that has increased trimming capabilities; providing a mower that improved rear or drive wheel traction as the location of the sulky in relation to the lawn mower and position of the operator standing on the operator platform transfers the operator's weight to the rear or drive wheels; and providing a sulky with sulky arms and castering wheels that avoids turning issues and assists in facilitating the transfer and use of the operator's weight with the lawn mower.

Thus, there has been provided Applicant's unique inventive self-propelled lawn mower and sulky device. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. A sulky for attachment to a self-propelled lawn mower having a front end, a rear end, a left side, a right side, a pair of front wheels situated at the front end and a pair of rear wheels situated at the rear end, comprising:
    an operator platform having a proximal end and a distal end;
    a pair of sulky arms fixedly secured to the operator platform;
    a pair of caster wheels, the pair of caster wheels each having a front, a middle, and a rear, the middle equally positioned between the front and the rear;
    a hitch bar having a proximal end and a distal end and a pair of opposed hinge arms;
    a first hinge means for releaseably attaching the proximal end of the operator platform to the distal end of the hitch bar and permitting the operator platform to pivot about a first axis of rotation in relation to the hitch bar;
    a second hinge means for releaseably attaching one of the opposed hinge arms at the proximal end of the hitch bar to the left side of the self-propelled lawn mower and the other of the opposed hinge arms at the proximal end of the hitch bar to the right side of the self-propelled lawn mower, the second hinge means positioned adjacent to each of the rear wheels, the second hinge means permitting the hitch bar to pivot about a second axis of rotation in relation to both the left and right side of the self-propelled lawn mower and adjacent to the pair of rear wheels;
    a third hinge means for attaching the caster wheels to the sulky arms, the middle of the caster wheels situated in substantial alignment with the distal end of the operator platform, the third hinge means permitting the caster wheels to pivot about a third axis of rotation in relation to the sulky arms; and
    wherein the first axis of rotation, the second axis of rotation, and the third axis of rotation are each different than one another.

2. The device of claim 1 wherein the first axis of rotation is about a first horizontal axis.

3. The device of claim 2 wherein the second axis of rotation is about a second horizontal axis, the second horizontal axis substantially perpendicular to the first horizontal axis.

4. The device of claim 1 wherein the third axis of rotation is about a vertical axis.

5. The device of claim 1 wherein the first hinge means comprises a shaft having a shaft hole, a tube, a means for securing the tube to the operator platform, and a first pin securing means for releaseably securing the shaft to the tube.

6. The device of claim 5 wherein the first pin securing means comprises a pin, a wheel, and a fastening member.

7. The device of claim 1 wherein the second hinge means comprises the hinge bar having the pair of opposed hinge arms, each hinge arm providing a hinge hole, a mounting bracket, an interconnecting bracket, and a second pin securing means.

8. The device of claim 1 wherein the third hinge means permits the caster wheels to pivot substantially three hundred and sixty degrees about the third axis of rotation in relation to the sulky arms.

9. The device of claim 1 wherein the third hinge means comprises a tube and a yoke having a yoke shaft.

10. The device of claim 1 wherein the rear end of the self-propelled lawn mower further defines a vertical plane.

11. The device of claim 10 wherein the self-propelled lawn mower comprises at least one handle bar, the at least one handle bar positioned between the front end and rear end of the self-propelled lawn mower and forward of the vertical plane.

12. The device of claim 10 wherein the at least one handle bar comprises a securing bar and a placement bar, each formed at an angle to one another.

13. A sulky for attachment to a self-propelled lawn mower having a front end and a rear end, a left side and a right side, a pair of rear wheels situated at the rear end, and the rear end further defining a vertical plane, comprising:
    an operator platform having a proximal end and a distal end;
    a hitch bar having a proximal end and a distal end and a pair of opposed hinge arms;
    means for attaching the proximal end of the operator platform to the distal end of the hitch bar;
    one of the opposed hinge arms at the proximal end of the hitch bar affixed to the left side of the self-propelled lawn mower and the other of the opposed hinge arms at the proximal end of the hitch bar affixed to the right side of the self-propelled lawn mower;
    a pair of caster wheels, the pair of caster wheels each having a front, a middle, and a rear, the middle equally positioned between the front and the rear;
    means for attaching the pair of caster wheels to the operator platform;
    the middle of the caster wheels situated in substantial alignment with the distal end of the operator platform;
    at least one handle bar having a proximal end and a distal end and comprising a securing bar and a placement bar, the securing bar originating at the proximal end of the at least one handle bar and affixed to the self-propelled lawn mower, the securing bar extending upwardly and away from the rear end toward the front end of the self-propelled lawn mower, the other end of the securing bar affixed to the placement bar, the placement bar extending upwardly and toward the rear end of the self-propelled lawn mower, the placement bar terminating in a gear handle at the distal end of the at least one handle bar;
    the gear handle positioned in a substantially vertical alignment with the proximal end of the at least one handle bar and situated forward of the vertical plane between the front end and rear end of the self-propelled lawn mower;
    means for permitting the operator platform to rotate about a first axis of rotation in relation to the self-propelled lawn mower;
    means for permitting the operator platform to rotate about a second axis of rotation in relation to the self-propelled lawn mower; and
    means for permitting the operator platform to rotate about a third axis of rotation.

14. The device of claim 13 wherein the first axis of rotation is about a first horizontal axis.

15. The device of claim 14 wherein the second axis of rotation is about a second horizontal axis, the second horizontal axis substantially perpendicular to the first horizontal axis.

16. The device of claim 13 wherein the third axis of rotation is about a vertical axis.

* * * * *